(12) United States Patent
Townsend

(10) Patent No.: US 8,858,374 B2
(45) Date of Patent: Oct. 14, 2014

(54) AUTOMATIC PRETENSIONING MECHANISM FOR TENSION ELEMENT DRIVES

(75) Inventor: William T. Townsend, Weston, MA (US)

(73) Assignee: Barrett Technology, Inc., Newton, MA (US)

(*) Notice: Subject to any disclaimer, the term of this patent is extended or adjusted under 35 U.S.C. 154(b) by 1719 days.

(21) Appl. No.: 10/584,021

(22) PCT Filed: Dec. 23, 2004

(86) PCT No.: PCT/US2004/043428
§ 371 (c)(1),
(2), (4) Date: Jun. 21, 2006

(87) PCT Pub. No.: WO2005/065275
PCT Pub. Date: Jul. 21, 2005

(65) Prior Publication Data
US 2007/0149328 A1    Jun. 28, 2007

Related U.S. Application Data

(60) Provisional application No. 60/532,847, filed on Dec. 24, 2003.

(51) Int. Cl.
*F16H 7/08*    (2006.01)
*F16H 19/06*   (2006.01)
*F16H 19/00*   (2006.01)

(52) U.S. Cl.
CPC .......... *F16H 19/0672* (2013.01); *F16H 19/005* (2013.01)
USPC ............................ 474/101; 254/213; 254/214

(58) Field of Classification Search
USPC ...................... 474/101; 74/501.5 R; 254/220; 242/388.1, 388.5
See application file for complete search history.

(56) References Cited

U.S. PATENT DOCUMENTS 796,720 A * 8/1905 Hanscom .................. 242/147 R
2,661,492 A 12/1953 Oishei
(Continued)

FOREIGN PATENT DOCUMENTS

DE    10225268 A1    12/2003
EP    1 372 128     12/2003
(Continued)

OTHER PUBLICATIONS

Townsend, William T., "The Effect of Transmission Design on Force-Controlled Manipulator Performance," Massachusetts Institute of Technology (Apr. 1988).
(Continued)

*Primary Examiner* — Robert A Siconolfi
*Assistant Examiner* — James Hsiao
(74) *Attorney, Agent, or Firm* — Pandiscio & Pandiscio

(57) ABSTRACT

A mechanism for pretensioning a cable, or like tension element, of a tension-element drive selectively engages the motor drives of the cable for pretensioning. The mechanism uses a sleeve on which a portion of the cable is wound, with another portion of the cable wound in an opposed direction on a drive shaft on the motor. A clutch connects the sleeve to the motor output shaft. An initiator mechanism selectively stops rotation of the sleeve and the cable portion wound on the sleeve while allowing the motor torque to act on the other end of the cable wound on the drive shaft.

22 Claims, 6 Drawing Sheets

(56) References Cited

U.S. PATENT DOCUMENTS

| | | | |
|---|---|---|---|
| 3,240,473 A * | 3/1966 | Coffey et al. | 410/103 |
| 3,324,719 A * | 6/1967 | Segrave | 73/160 |
| 3,549,099 A * | 12/1970 | Hofbauer et al. | 242/531.1 |
| 4,957,014 A | 9/1990 | Burke | |
| 5,046,375 A | 9/1991 | Salisbury, Jr. et al. | |
| 5,388,480 A | 2/1995 | Townsend | |
| 5,745,382 A * | 4/1998 | Vilim et al. | 706/16 |
| 6,332,629 B1 * | 12/2001 | Midorikawa et al. | 280/806 |
| 2003/0017894 A1 * | 1/2003 | Kaiser et al. | 474/112 |
| 2004/0169112 A1 | 9/2004 | Grossart | |

FOREIGN PATENT DOCUMENTS

| | | |
|---|---|---|
| FR | 2 216 859 | 8/1974 |
| WO | WO 01/70547 | 9/2001 |

OTHER PUBLICATIONS

European Examination Report dated Nov. 15, 2010, corresponding to European Patent Application No. 04 815 497.5.

* cited by examiner

End Views

Profile Views

AUTOMATIC PRETENSIONING MECHANISM FOR TENSION ELEMENT DRIVES

CROSS-REFERENCE TO RELATED APPLICATION

This application claims priority to U.S. Provisional Patent Application Ser. No. 60/532,847 filed Dec. 24, 2003, the disclosure of which is incorporated herein by reference.

FIELD OF INVENTION

This invention relates to an automatic pretensioning mechanism for tension-element drives.

BACKGROUND OF INVENTION

Tension-element drives and especially finely-stranded, stainless-steel cable drives have taken on increased importance in mechanical transmissions used for high-performance automated machines. Increased exploitation of computer control places a higher value on lightweight, compact machines that react quickly to motor commands, and often these characteristics are achieved through the use of tension-element drives. While cable drives are the most common type of tension-element drive used in automated machines, this invention applies also to the broader category of tension-element drives, which extends to tapes/bands, belts, ropes, and chains.

When properly designed, tension-element drives have high material strength, high stiffness, low weight, low velocity ripple, low torque ripple, no backlash, and low friction. Furthermore, they do not leak and do not require surface lubrication. Cables and some other tension-element types can be guided several meters around pulleys through complex and twisting geometries. Cables and all other tension-element drives do not transfer power through compression or shear; and as a result they avoid added compliance and strength limitations found in gear teeth, harmonic drives, linkages, drive shafts, and push rods caused by bending moments or buckling. Cable drives transmit mechanical energy with far greater power density than hydraulic systems because the tensile strength of extruded stainless steel, even derated by a factor of 3 for inter-fiber air gaps, transmits power at an order of magnitude higher stress (400 MPa) compared the highest-pressure hydraulic systems (40 MPa). When designed for reliability, cable drives have a history of dependability in such demanding applications as aerial trams, cable cars, aircraft and missile control surfaces, cranes, and elevators.

High performance in servo-driven cable drives and many other tension-element drives is maintained only when the cables are pretensioned to at least one-half of their maximum operating tensions so that neither of an antagonistic pair of cables becomes slack, even when subjected to full operational motor torque. Pretension is the equal tension present in both cables of a tension-element drive when zero torque is exerted from the drive or driven shafts. With proper pretension $T_P$, the high and low instantaneous tensions $T_H$ and $T_L$ in a pair of antagonistic cables driven by motor torque $\tau_M$ are $$T_H = T_P + \tau_M(r_M + r_C) > 0 \text{ and}$$

$$T_L = T_P - \tau_M(r_M + r_C) > 0,$$

where $r_C$ is the cable radius and $r_M$ is the wrap radius of the motor shaft. As long as there is adequate pretension in the system before operation, at least some level of tension will remain in both cables under any operating torque, ensuring no slack will form in either cable, even momentarily.

Slack can allow enormous cable loads due to wind-up each time the motor reverses torque. Momentarily the motor is allowed to accelerate in the opposite direction from the rest of the system, increasing its kinetic energy until the slack suddenly disappears and the kinetic energy is instantly converted into very high cable stress causing local yielding in individual cable fibers, and leading to rapid cable stretch and premature cable failure. Pretension prevents this behavior.

Pretensioned cable pairs also exhibit twice the drive stiffness over non-pretensioned cable pairs because both, rather than one, of the cable stiffness contribute in parallel to the overall drive stiffness.

Several methods have been used to apply pretension—e.g. applicant's U.S. Pat. Nos. 5,388,480 and 5,046,375, and applicant's PhD thesis entitled "The Effect of Transmission Design on Force-Controlled Manipulation", Massachusetts Institute of Technology (1988), the disclosure of which is herein incorporated by reference. The previous pretensioning methods, e.g. those described in Townsend PhD thesis 1988 and U.S. Pat. No. 5,388,480, are not automatic or easily automated. Unfortunately pretensioning is a highly iterative process because local pretension induced in a short segment of the cable drive does not easily migrate to the rest of the drive due to the exponentially nonlinear capstan effect, given by the equation:

$$T_H = T_L \times e^{\mu \beta},$$

where $T_H$ and $T_L$ are the tensions at the ends of a cable wrapped $\beta$ radians around a cylinder with friction coefficient $\mu$ between the cylinder and cable surfaces. For stainless-steel cable running on metal or ceramic cylinders, $0.2 \leq \mu \leq 0.5$, and is generally constant in a given design. With $\mu$ nearly constant, the exponential capstan equation is extraordinarily sensitive to the number of cable wraps.

For example, assume that the friction coefficient is 0.3, and a cable is wrapped only 5 turns around a pulley. In a hypothetical tug of war, between an ant and an ox pulling on opposite ends of this wrapped cable, the ant would only have to pull with 1 gm (force) to stop an ox pulling with 80 kg (force). The capstan effect guides many design aspects of cable drives. For example, to protect the normally-weaker terminated ends of the cable from high loads, two or three extra wraps of cable beyond the working range of the drive eliminates virtually all shock-load exposure at the terminations. The capstan effect also constrains the design of the popular split-pinion method of enabling pretensioning. In this method the two halves of the motor pinion are allowed briefly during pretensioning, to counter-rotate in the relative direction that eliminates cable slack and induces pretension. This method only works if neither cable straddles the split between the two halves of the motor pinion. If one of the cables straddles the split by more than a wrap or two, capstan effect will prevent relative rotation in the direction required to increase pretension.

A related factor is that cables exhibit higher performance and last longer if the pinion is scalloped with a helix that supports the circular cross-sectional shape of the cable. Otherwise the cable becomes elliptical under the high pressure between the cable and the pinion surface due to the radius of curvature of the wrapped cable. In an active cable drive, the cable repeatedly cycles from elliptical to circular as it wraps and unwraps off the pinion and pulley surfaces. When a pinion drives a larger diameter pulley, this lateral pressure is greater on the pinion by the ratio of their diameters. It is impractical to align the scallop patterns between a pinion and a pulley, partly because the process of pretension will change the alignment over the lifetime of the cable. But since the unwanted pressure is much higher on the pinion, the pinion alone is scalloped. However, pretensioning split in the pinion creates a similar alignment dilemma as the cables are pretensioned over their lifetime. Therefore, in known pretensioning systems, the pinion is only scalloped on one side of the pinion split with the other side left as a simple cylindrical surface that matches the radius of the bottom point of the scallop.

Cable damage due to cycling between circular and elliptical cross-sections depends on the frequency of cycling. A histogram of the most active locations of the average drive approximates a Gaussian distribution with the highest activity near the middle of the drive range and the least activity at each extreme of the drive range. Therefore, known designs place the pinion split near the extreme edge of the drive range so that actively cycling cable is nearly always supported by the scallop. As a result, the ends of the drive range are rarely used.

A cable pretensioner will only impose and store a local pretension in the compliance of the usually-short free span of cable between pulley tangents and just a couple of radians of the wrapped cable nearest the free span. The rest of the 90+% of cable is unaffected. The only way to migrate the pretension into the remainder of the wraps is to run the cable drive back and forth several times across its full range. This back-and-forth motion distributes the local pretension across the entire cable, leaving a weak but nearly uniform global pretension. To bring the pretension up to proper levels across the entire cable drive requires repeating the process multiple times. As a result, cable drives either are never pretensioned by the user or inadequately pretensioned, resulting in increased compliance, backlash, and rapid cable deterioration.

The worst drawback of tension-element drives is the lack of technicians familiar with their unique service requirements. For the strong benefits of tension-element drives to enjoy wider acceptance, users must be freed from the steep cable-maintenance learning curve and its tedious application. Through automatic pretensioning, the most important and tedious maintenance procedure for tension-element drives becomes virtually invisible to the user. Instead of teaching each user how to measure and maintain cable pretension, embedded machine intelligence applies this knowledge directly and with precision.

SUMMARY OF INVENTION

An automatic pretensioner allows automation of part or all of the iterative and tedious pretensioning process. The invention uses the powerful, yet controllable, torque of the drive itself to power the pretensioning process rather than to add a costly external drive of similar torque capability, for example, to drive a manual worm pretensioner.

Apparatus for pretensioning a cable drive according to the invention is powered by a drive motor with a rotary output shaft. An initiation mechanism selectively couples the torque of the output shaft to pretension the cable.

In one form of the invention, the selective initiation mechanism has a sleeve that extends axially over one axially extending section of the output shaft and is operatively coupled for rotation with the shaft in only one direction. The cable is wound in one sense on said shaft and in the opposite sense on said sleeve. The mechanical initiation device selectively blocks any rotation of the sleeve with respect to the shaft. As a result, when the mechanical device is selectively activated, the motor overcomes the previous pretension and rotates the shaft relative to the sleeve in the direction that increases pretension. The initiation mechanism can be a small electric solenoid that blocks the sleeve from rotating, thereby initiating the pretensioning process.

Other embodiments of the invention use an initiation mechanism that relies purely on actions of the prime servo motor. In one other form, the mechanical initiation device engages when cable unwraps from a location near a split between the shaft and sleeve. The lateral motion of the cable as the cable drive activates the initiation mechanism.

In another form, the invention includes a rotary combination lock. The output shaft drives the input to the combination lock mechanism allowing the pretensioning to be initiated at any drive location, but only after the motor reverses its velocity in a specific sequence of precisely-predetermined drive positions. The invention can also include torque control apparatus for the motor to set the level of pretension, e.g., a controller for the winding currents powering the motor.

In still other forms, the invention includes: (i) an encoder and a processor that sense and save the last pretension position so that the degree of pretension actually added to the cable drive can be monitored; (ii) apparatus to measure pretension, (iii) a processor operatively connected at least to the initiation mechanism that runs neural-network algorithms that learn and adapt to individual users and applications, and/or transmits schedule and alert information over a communications network.

These and other features and objects of the invention will be more fully understood from the following detailed description of exemplary embodiments of the invention, which should be read in light of the accompanying drawings.

DETAILED DESCRIPTION OF EXEMPLARY EMBODIMENTS OF THE INVENTION

Figure 1:
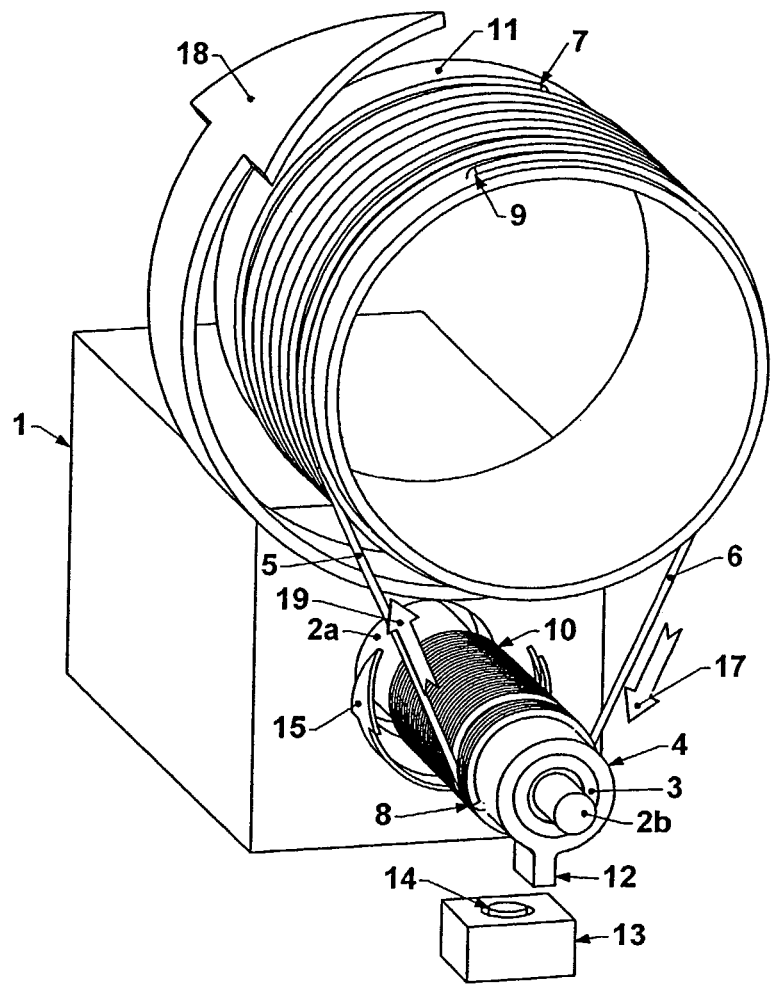
FIG. 1 is a view in perspective of a tension-element (cable) drive automatic pretensioning mechanism according to the present invention.

FIG. 1 illustrates a simple, single-stage, tension-element drive with an automatic pretensioner according to the invention. A servo-motor 1 is commanded to apply a torque to its output shaft 2, which has two diameters, 2a and 2b. A one-way clutch 3, such as the Timken/Torrington RC-061008-FS drawn-cup roller clutch, prevents sleeve 4 from rotating in the clockwise 15 direction with respect to shaft 2. Cable 5 is anchored 8 to the surface of sleeve 4, and is wrapped several times in the clockwise 15 direction along a right-hand helix towards the face of motor 1. Cable 5 then spans tangentially, as indicated by directional arrow 19, to the surface of a driven pulley 11, maintaining its pitch angle and is wrapped several times in the clockwise direction 18, in another right-hand helix that continues to maintain the same pitch angle until anchored at 7 at its end on the surface of pulley 11. Similarly a second cable 6 is anchored at 9 at the opposite end of pulley 11 and wrapped several turns in the clockwise direction 18 using the same pitch angle as cable 5, in a right-hand helix until it spans tangentially 17 at approximately the same lateral position as the span of cable 5. Cable 6 then is wrapped several turns along a right-hand helix in the clockwise direction 15 with the same pitch angle on the larger shaft surface 2a until it terminates on shaft 2 at anchor 10. The base of solenoid 13 is fixed with respect to motor 1. Under normal operating conditions, its plunger 14 is retracted, allowing rigid finger 12 secured on, and extending radially from, sleeve 4, to rotate unimpeded.

Figure 2:
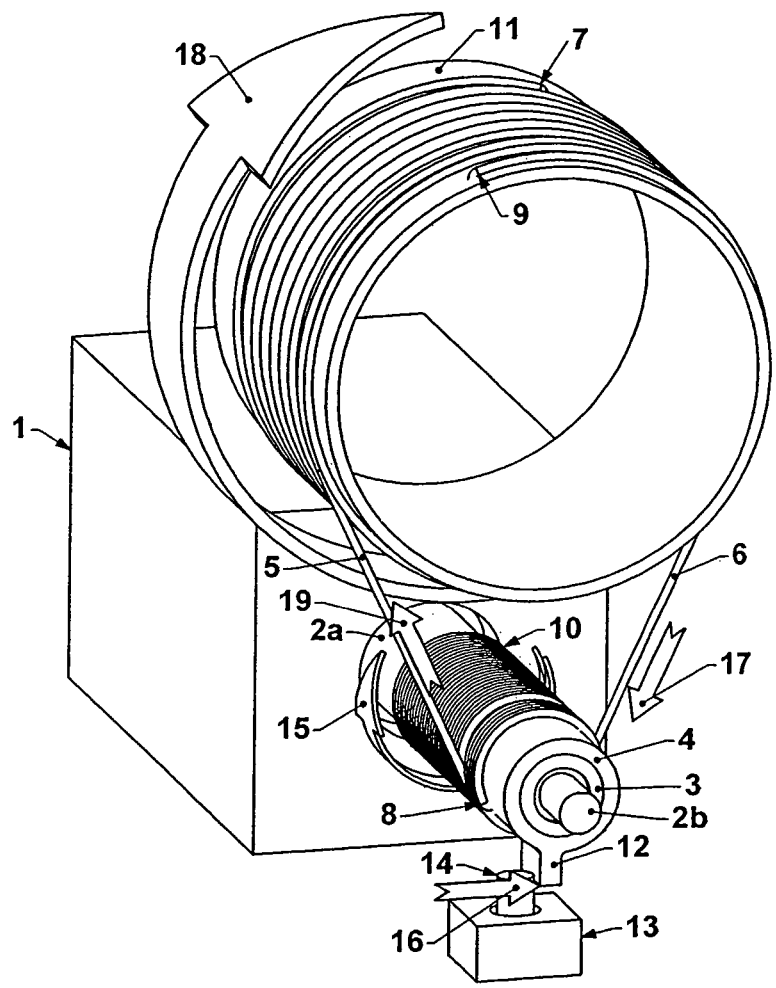
FIG. 2 is a perspective view of the mechanism shown in FIG. 1 with an initiation mechanism engaged.
Figure 3:
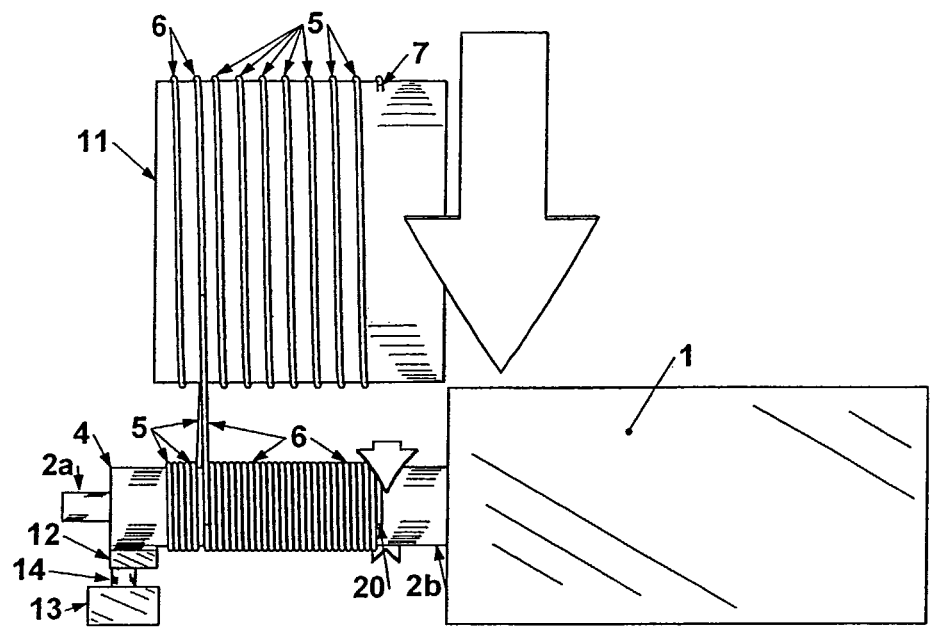
FIGS. 3 and 4 are detailed views in side elevation and partially in vertical section, respectively, of the pretensioning mechanism shown in FIGS. 1 and 2.
Figure 4:
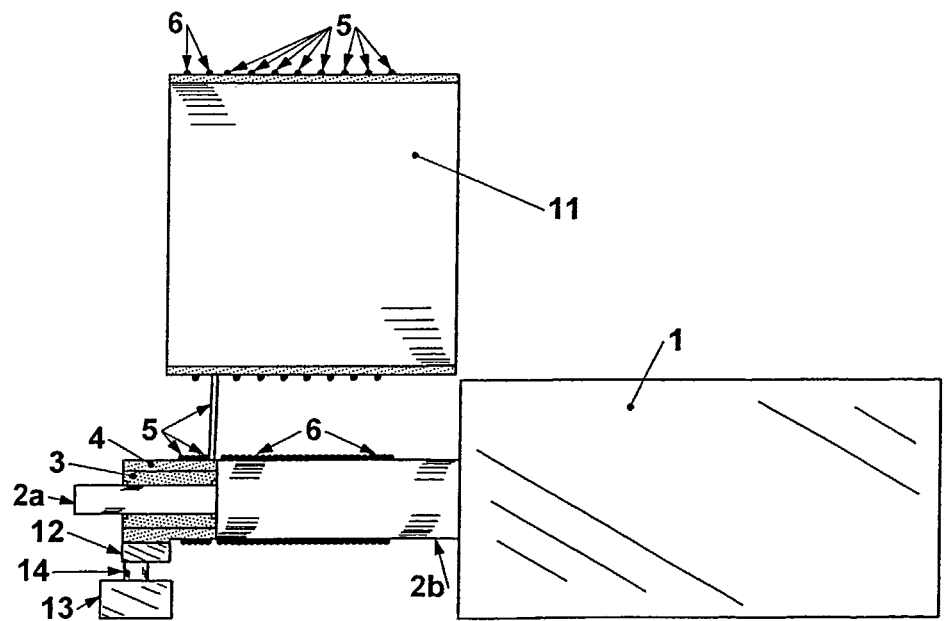

If the cable pretension $T_P$ dips below the ideal pretension $T_P^*$, the automatic pretensioner can restore it as illustrated by FIGS. 2, 3, and 4. Plunger 14 extends from solenoid 13, the motor is commanded to rotate in a clockwise 15 direction until finger 12 is stopped by reaction force 16 of the plunger. As the motor torque increases above the present pretension it induces a small relative motion between shaft at 2 and sleeve 4 corresponding to increased pretension.

Figure 5:
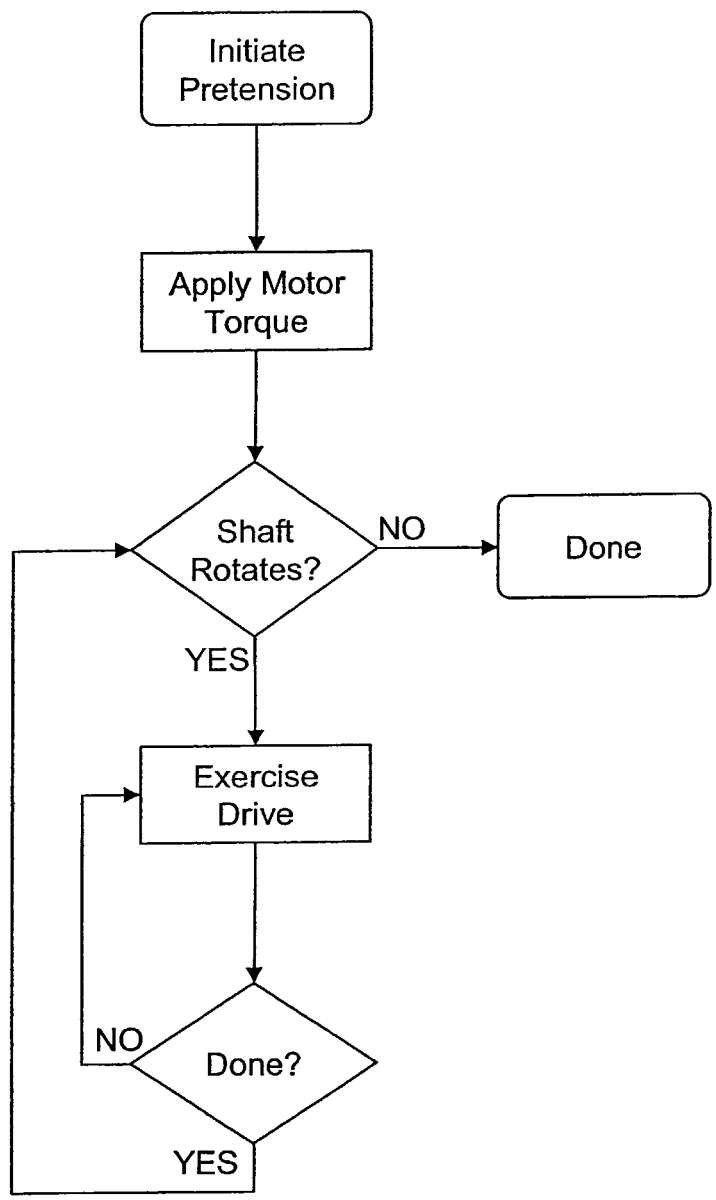
FIG. 5 is a flow chart of the control of the automatic pretensioning mechanism of FIGS. 1-4 to apply or restore a desired level of pretension.

Regardless of the type of initiation, an automatic pretensioner of the present invention exploits the embedded processor of an intelligent machine using the process shown in the flow chart of FIG. 5. FIG. 5 illustrates the highly iterative process of adding local pretension, running the drive back and forth through the full range several times, then adding more local pretension, and repeating the process. The servo accurately applies a predetermined torque in each pretensioning effort. Several strategies may be employed to optimize the process, such as setting the local pretension well above the ultimate desired global pretension in order to reduce the number of cycles required in FIG. 5. Any time the servo motor applies torque to restore pretension, it saves the resulting encoder position at the applied torque. Then on subsequent pretension efforts the new encoder position can be compared to the last saved encoder position to measure any change. If there is no change in position, then no increase in pretension has occurred. As pretension in the system is added, the position differences will diminish asymptotically to zero. At some predetermined small position difference the global pretension can be considered to be complete, and the drive is ready for extended use.

Automatic pretensioning opens possibilities for the system to monitor and record pretension maintenance patterns. Combined with other information available to the servo drive controller, such as how long, how fast, and how hard the drive has been run, embedded machine intelligence can adapt to specific users and applications to improve prediction of the best pretensioning maintenance schedule. Also, the record of the total rotational displacement of sleeve 4 since the first installation and pretensioning of the cables can help predict the need to replace cables, alert the user via email, and automatically order a set of replacement cables or schedule a service call with the machine supplier by the XML Internet protocol.

More specifically, the pretensioner of the present invention can use sensor data to predict cable failure. The operation can be analogized to a hand-wavy pointer to neural-net learning algorithms. For each joint axis, a robot must set pretension several times until there is not much improvement. Over the whole set of pretension iterations one will be able to judge the total number of encoder counts that have been required. The bigger this amount, the worse the cable's need is for re-pretensioning. It may be a long time since the last pretension or at least the particular cable drive has been driven a large number of motor turns (with, e.g., 40,960 encoder counts/turn) since the last tensioning. For example, suppose that a "normal" amount of slackening over 10,000 motor turns is 100 encoder counts (far less than 1% stretch). If the arm runs for 20,000 motor turns before the next pretensioning, which results in 200 encoder counts of stretch, this is considered fine. But the rate of stretching increases dramatically before a failure. Therefore, if the next 20,000 motor turns produces, say 1000 encoder counts of stretch, maintenance should be scheduled.

Also, like car tires, one can generally assume a certain number of miles before one has to change them. But if a normal set of tires is used in racing, e.g., the Indianapolis 500 race, then one knows those same tires will not last even 500 miles (since they change the tires during such a long race). Similarly, in the cable drives, one can also collect and store the conditions of speed, acceleration, and torque for each encoder count, or each motor turn. This way, one can also begin to account for the severity of the service in addition to the amount.

While the solenoid method of initiating the pretension process is readily implemented, alternate methods are disclosed below. The embodiment used depends on the specific application. As it may be difficult to provide any control signal beyond control of the servo motor or there may not be a power source for the solenoid, the alternate solutions require neither, but instead rely on other factors, such as precise control of the motor position near the extreme edge of the drive range, or a slackening of the cable.

It is important to note that with modern servo drives it is straightforward to design electronically—enforced, virtual drive-range limits that are only slightly more restrictive than the mechanical drive-range limit stops. The difference creates a small keep-out zone that can be reserved for special uses, such as initiating pretensioning. Each of the following two methods can exploit this feature.

Figure 6A:
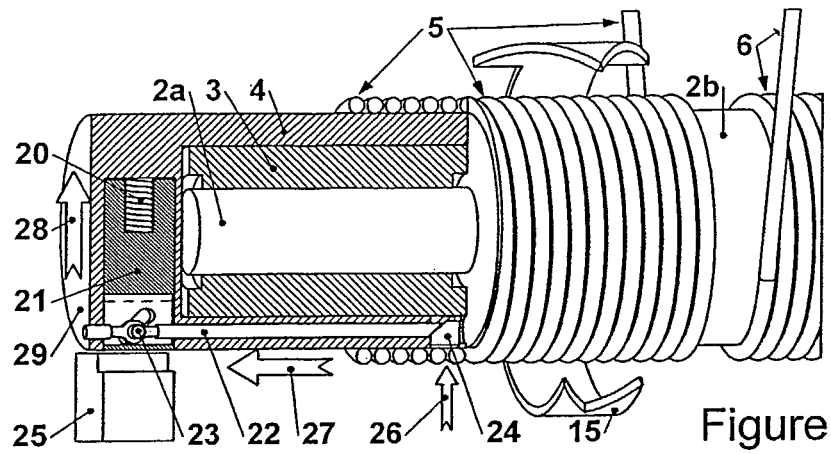
FIG. 6A-6C are perspective views with portions broken away of an alternative embodiment of the invention.
Figure 6B:
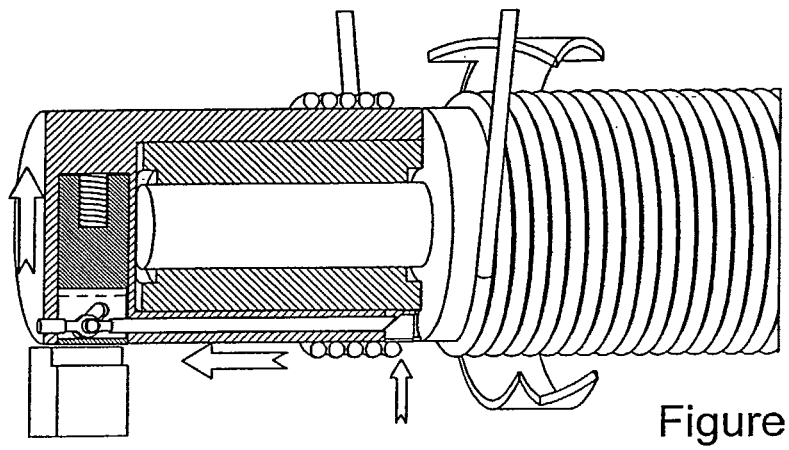
Figure 6C:
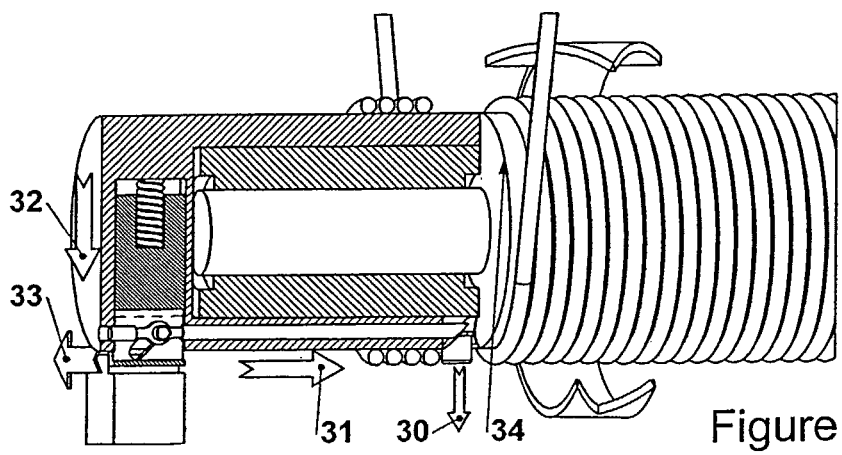
Figure 7A:
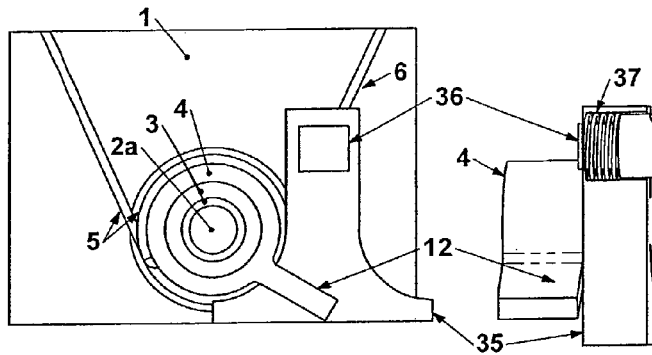
FIGS. 7A and 7B show another alternative embodiment of the invention in end elevation and side elevation with portions broken away, during normal operation.
Figure 7B:
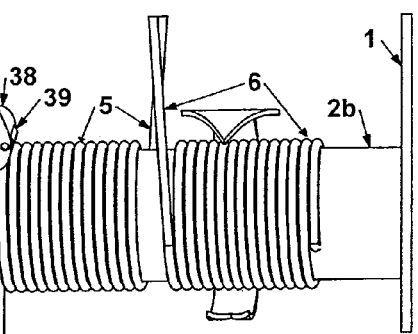
Figure 7C:
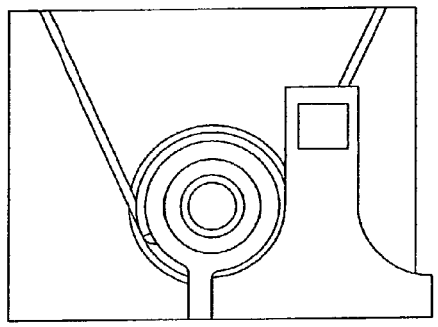
FIGS. 7C and 7D correspond to FIGS. 7A and 7B, with a cable making first contact with a slider.
Figure 7D:
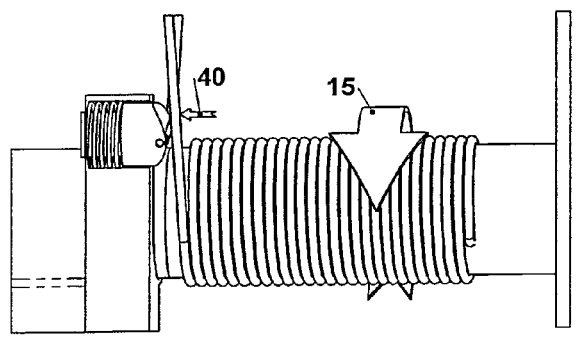
Figure 7E:
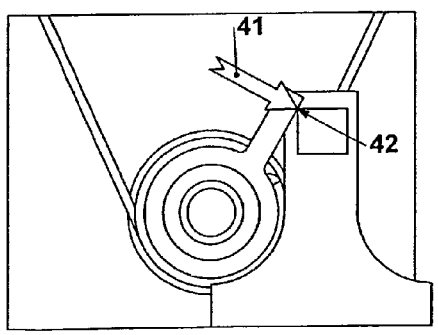
FIGS. 7E and 7F correspond to FIGS. 7A and 7B as well as 7C and 7D with the cable fully engaging the slider.
Figure 7F:
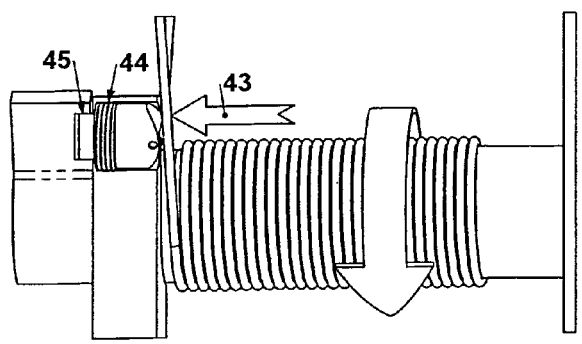

A method employing the structure shown in FIG. 6 uses the cable pretension itself to initiate pretensioning. FIG. 6A shows the initiation mechanism during normal drive operation when the pretensioning process is not desired. An extendable finger 21 is constrained to slide radially within a slot in sleeve 29. A compression spring 20 applies a force on finger 21 in the outward direction. For normal operation, however, pin 23 applies an opposite radial force 28 through an angled slot adequate to compress spring 20 and keep finger 21 in its fully retracted position. Pin 23 is constrained to move only in the axial direction 27 in line with connecting rod 22. Connecting rod 22 is driven at its opposite end by the force 26 of wrapped cable 5 pushing on angled pin 24. FIG. 6B shows the mechanism just before pretension initiation. When cable 5 unwraps in FIG. 6C to the point where pin 24 becomes exposed, the retracting force on finger 21 disappears and finger 30 is forced outward 32, pushing on pin 23, and sliding connecting rod 22 aside 31. Once finger 21 is deployed, it engages fixed obstacle 25 on its next clockwise 15 rotation with reaction force 33, thereby allowing the servo motor to set a pretension. Note that neither cable crosses the pinion split edge 34 once pretensioning commences. In this method, the system defaults to blocking rotation of sleeve 4 until cables are fully installed and pretensioned, which can be an advantage if the active motor is employed to aid in what is now a normally all-manual cable installation and initial pretensioning. This FIG. 6 method is normally initiated by moving the cables to the end of the drive range and thereby unwrapping cable 5 to release 34 pin 24. However, loss of pretension under otherwise normal conditions FIG. 7 illustrates another structure and related method for initiating the pretension process that exploits the axial traveling of the free span of cable 6. FIGS. 7A and 7B show the system in normal operation. Slider 38 is mounted in immovable base 35 and constrained to move only the axial direction by an axial bore. Slider 38 is square on one end to prevent it from rotating so that roller 39 always engages cable 6 at right angles. Roller 39 prevents damage from sliding friction against cable 6. Spring 37 keeps the system retracted so that square face 36 will not impede finger 12 under normal operation. A retention feature on the square end of slider 38 prevents it from passing completely through the mating bore in immovable base 35. When pretension is desired, the motor is driven to near the end of its drive range, as shown in FIGS. 7C and 7D, so that cable 6 makes initial contact 40 with roller 39 as the motor is rotated in the clockwise 15 direction. When fully engaged, as shown in FIGS. 7E and 7F, spring 37 is compressed 44 by the lateral cable force 43 allowing slider 38 to extend into the path of finger 12. On the subsequent rotation of finger 12, the force 41 applied at 42 stops sleeve 4 allowing the servo motor to set a pretension. This FIG. 7 method is the opposite of the previous method in that the pretension initiation cannot be engaged until after the cables are fully installed and pretensioned. This behavior can be a benefit in the case where motor 1 is not exploited, e.g. for safety reasons, during the manual cabling process.

While the invention has been described with reference to multiple exemplary embodiments, it will be understood that various modifications and alterations will occur to those skilled in the art. Such modifications and alterations are intended to fall within the scope of the appended claims.

What is claimed is:

1. Apparatus for pretensioning a tension-element drive powered by a drive motor having a rotary output shaft, the apparatus comprising:
   an initiation mechanism that utilizes the torque of the rotary output shaft to pretension the tension-element, the initiation mechanism comprising a sleeve that extends axially over an axially-extending section of the rotary output shaft and is operatively coupled for rotation with the shaft in only one direction, and a mechanical device that selectively blocks any rotation of the sleeve with respect to the rotary output shaft, the mechanical device being selectively mechanically engagable with, and selectively mechanically disengageable from, the sleeve, with the mechanical device blocking any rotation of the sleeve with respect to the rotary output shaft when the mechanical device is mechanically engaged with the sleeve, and wherein the tension element is wound in one sense on said rotary output shaft and in the opposite sense on said sleeve,
   whereby, when the mechanical device is selectively activated so as to block any rotation of the sleeve with respect to the rotary output shaft, the motor overcomes the previous pretension and rotates the rotary output shaft relative to the sleeve in the direction that increases pretension.

2. The apparatus of claim 1 wherein said initiation mechanism is fully automatic.

3. The apparatus of claim 1 wherein said initiation mechanism is semi-automatic.

4. The apparatus according to claim 1 wherein said mechanical device comprises a solenoid.

5. The apparatus according to claim 1 wherein said mechanical device defaults to being engaged when a tension element is not present.

6. The apparatus according to claim 1 wherein the mechanical device defaults to being disengaged when a tension element is not present.

7. The apparatus according to claim 1 wherein the mechanical device is engaged when said tension element unwraps from a location near a split between the shaft and sleeve.

8. The apparatus according to claim 1 wherein the mechanical device is operated by the lateral motion of the tension element as the cable drive operates.

9. The apparatus according to claim 1 wherein said mechanical device comprises a thread or ball screw that drives a nut axially to initiate pretensioning.

10. The apparatus of claim 1 further comprising a rotary combination lock and wherein the output shaft drives the input to said combination lock mechanism allowing the pretensioning to be initiated at any drive location but only after the motor reverses its velocity in a specific sequence of precisely-predetermined drive positions.

11. The apparatus of claim 10 further comprising a processor operatively coupled to said initiation mechanism when n velocity reversals are required to match the combination, and where said processor records the last n−1 velocity-reversal positions, and wherein said processor foils successful completion of the combination by adding or subtracting a slight distance to any commanded velocity-reversal position that would otherwise complete the combination.

12. The apparatus of claim 10 in which the initiation mechanism includes a spring and trigger and wherein normal rotation of the motor immediately after a pretension event causes the spring to be compressed, so that it can be released by the trigger when the proper combination-lock rotations are entered.

13. The apparatus of claim 1 further comprising torque control apparatus for the motor that sets the level of pretension.

14. The apparatus of claim 13 wherein said torque control apparatus comprises a controller for the winding currents powering the motor.

15. The apparatus of claim 1 further comprising an encoder and a processor that sense and save the last pretension position so that the degree of pretension actually added to the tension-element drive can be monitored.

16. The apparatus of claim 15 wherein the tension-element drive exhibits a capstan effect and the pretensioning apparatus operates to produce multiple local pretensions in sequence alternating with running the drive over its full range at least one time.

17. The apparatus of claim 13 wherein the pretension that is set exceeds the ultimate desired pretension to reduce the number of local-pretensioning iterations to achieve the correct global pretension.

18. The apparatus of claim 1 further comprising means to measure pretension.

19. The apparatus of claim 18 wherein said measuring means comprises a strain gage.

20. The apparatus of claim 1 further comprising a processor operatively connected at least to said initiation mechanism that runs neural-network algorithms that learn and adapt to individual users and applications.

21. The apparatus of claim 20, wherein processor aids in the development of maintenance schedules automatically.

22. The apparatus of claim 20 wherein said process or transmits schedule and alert information over a communications network.

* * * * *